US011544989B1

(12) United States Patent

Seelig et al.

(10) Patent No.: US 11,544,989 B1

(45) Date of Patent: Jan. 3, 2023

(54) GAMING SYSTEM AND GAMING DEVICES WITH HOLOGRAPHIC PROJECTION FEATURE

(71) Applicants: Jerald Seelig, Miramar, FL (US); Tara Townsend, San Francisco, CA (US)

(72) Inventors: Jerald Seelig, Miramar, FL (US); Tara Townsend, San Francisco, CA (US)

( * ) Notice: Subject to any disclaimer, the term of this patent is extended or adjusted under 35 U.S.C. 154(b) by 0 days.

(21) Appl. No.: 16/946,017

(22) Filed: Jun. 2, 2020

Related U.S. Application Data

(60) Provisional application No. 62/857,251, filed on Jun. 4, 2019.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.

CPC ................................ *G07F 17/3211* (2013.01)

(58) Field of Classification Search

CPC ....................................................... G07F 17/32

USPC .................. 463/1, 20, 22, 25, 30, 32, 39, 40

See application file for complete search history.

(56) References Cited

U.S. PATENT DOCUMENTS

| | | | | |
|---|---|---|---|---|
| 4,421,317 | A * | 12/1983 | Hector | A63F 13/08 463/32 |
| 7,708,640 | B2 * | 5/2010 | Burak | G07F 17/3213 463/30 |
| 8,523,673 | B1 * | 9/2013 | Boyd | A63F 13/215 463/34 |
| 10,762,812 | B1 * | 9/2020 | Thornton | G06F 1/1626 |
| 2005/0164759 | A1 * | 7/2005 | Smith | G07F 17/3293 463/11 |
| 2010/0201949 | A1 * | 8/2010 | Barnett | G03B 25/00 352/101 |
| 2014/0370978 | A1 * | 12/2014 | Pececnik | A63G 7/00 463/31 |
| 2018/0120766 | A1 * | 5/2018 | Kline | G03H 1/2249 |

OTHER PUBLICATIONS

Luxury Launches, "Obscura CueLight Interactive Pool Table System is back with a bang", https://luxurylaunches.com/decor/obscura_cuelight_interactice_pool_table_system_is_back_with_a_band.php#:~:text=YoucanbuytheCueLightSyste . . . , Jul. 6, 2012, 3 pages.

* cited by examiner

*Primary Examiner* — Adetokunbo O Torimiro

(74) *Attorney, Agent, or Firm* — Resolute Legal PLLC

(57) ABSTRACT

A gaming system is provided that includes a gaming device which has at least one input device to receive an input from a player and at least one display device to relay gaming information to the player. The gaming system further includes a holographic image system configured to project a holographic image into a space outside of the gaming device. The holographic image system may be associated with a single gaming device, or which a plurality of gaming devices, such as a bank of gaming machines.

5 Claims, 4 Drawing Sheets

GAMING SYSTEM AND GAMING DEVICES WITH HOLOGRAPHIC PROJECTION FEATURE

CROSS-REFERENCE TO RELATED APPLICATION

This application claims the benefit of U.S. Provisional Application No. 62/857,251, which was filed on Jun. 4, 2019, the contents of which are hereby incorporated by reference.

FIELD

The disclosed embodiments relate to methods of presenting and playing games and gaming machines configured to present games as well as methods and devices for creating immersive gaming environments.

BACKGROUND

Over the past decade there has been a push to engage the millennial generation to the gaming floors. This effort has been undertaken by the leading gaming manufacturers with little success. Gaming revenues and gaming machine counts have been reduced over the past several years as the gaming machines are not earning at the levels that gaming operations expect.

Gaming manufacturers are primarily focused on the gaming machines and signage. This has been their focus for many decades. In the past several years, this has become clear with the introduction of many new styles of slot machine boxes that utilize the new modern curved screens such as those being offered by television manufacturers. This in the box thinking has worked for decades and is responsible for the slow/no growth of gaming revenues for casinos around the world.

Traditional gaming machine have a single slot machine or group of machines that may be linked together to give away prizes with winning events. These prizes are given away on the display of the machine and may be linked to signage connected to the gaming machines. These displays are stagnant, meaning they are set to fixed positions and are incapable of moving outside of the designated areas or boxes that they are inside of. The traditional use of space fails to maximize the space available in a casino to engage and entertain gaming patrons.

For example, traditional gaming machine banks may feature a traditional gaming machine and/or banks of gaming machines that may have an "attract mode" to draw the attention of potential players. Accordingly, the machines may be standalone machines or may be placed together in a bank of machines to form shapes.

In some instances, machines may be standalone machines or may be linked together in a bank of machines to give away awards (typically progressive or jackpot awards). Such machines may use video screens that are in the gaming machines and/or in the overhead signage.

When a gaming machine is in attract mode, its only feature is essentially to flash or blink its lights and to show the prizes that can be won on the video screen. The gaming attract mode is limited to the physical gaming machine box or sign that displays the game and award.

Similarly during game play, when a gaming player has won a prize, their award with fanfare is displayed on either the gaming machine or the gaming signage video screens. The gaming award presentation is limited to the physical gaming machine box or sign that displays the game and award.

SUMMARY

Embodiments according to the present disclosure include methods of playing and presenting games, and gaming machines, systems and other devices which creative immersive and interactive gaming experiences for the player via holographic and other projections outside the gaming machine box.

One embodiment comprises a gaming machine system comprising a gaming device, a gaming network, and at least one holographic projection system. The system may comprise an attract mode where the holographic projection system projects one or more images into a space outside of a housing of the gaming machine. In some instances, the one or more images may correspond to single gaming machine. In other instances, the one or more images may correspond to bank of gaming machines. The gaming device may also include a gaming table or a plurality of gaming tables.

In other embodiments, the system may comprise a game play mode where the holographic projection system projects one or more images into space outside of the housing of the gaming machine. The one or more images may correspond to a prize won at a gaming machine. For example, the one or more images may indicate a bonus prize such as a progressive jackpot award.

Further objects, features, and advantages of the present invention over the prior art will become apparent from the detailed description of the drawings which follows, when considered with the attached figures.

DETAILED DESCRIPTION OF EMBODIMENTS

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise gaming systems and gaming machines with a holographic projection feature. A gaming machine of the invention may have various configurations. The gaming machine may be located at a casino (and as such may be referred to as a "casino gaming machine"). Such a machine may be part of a gaming system, such as a casino gaming system which links two or more of the gaming machines or one or more gaming machines with other devices, such as one or more table games, kiosks, accounting systems or servers, progressive systems or servers, player tracking systems or servers or the like.

Figure 1:
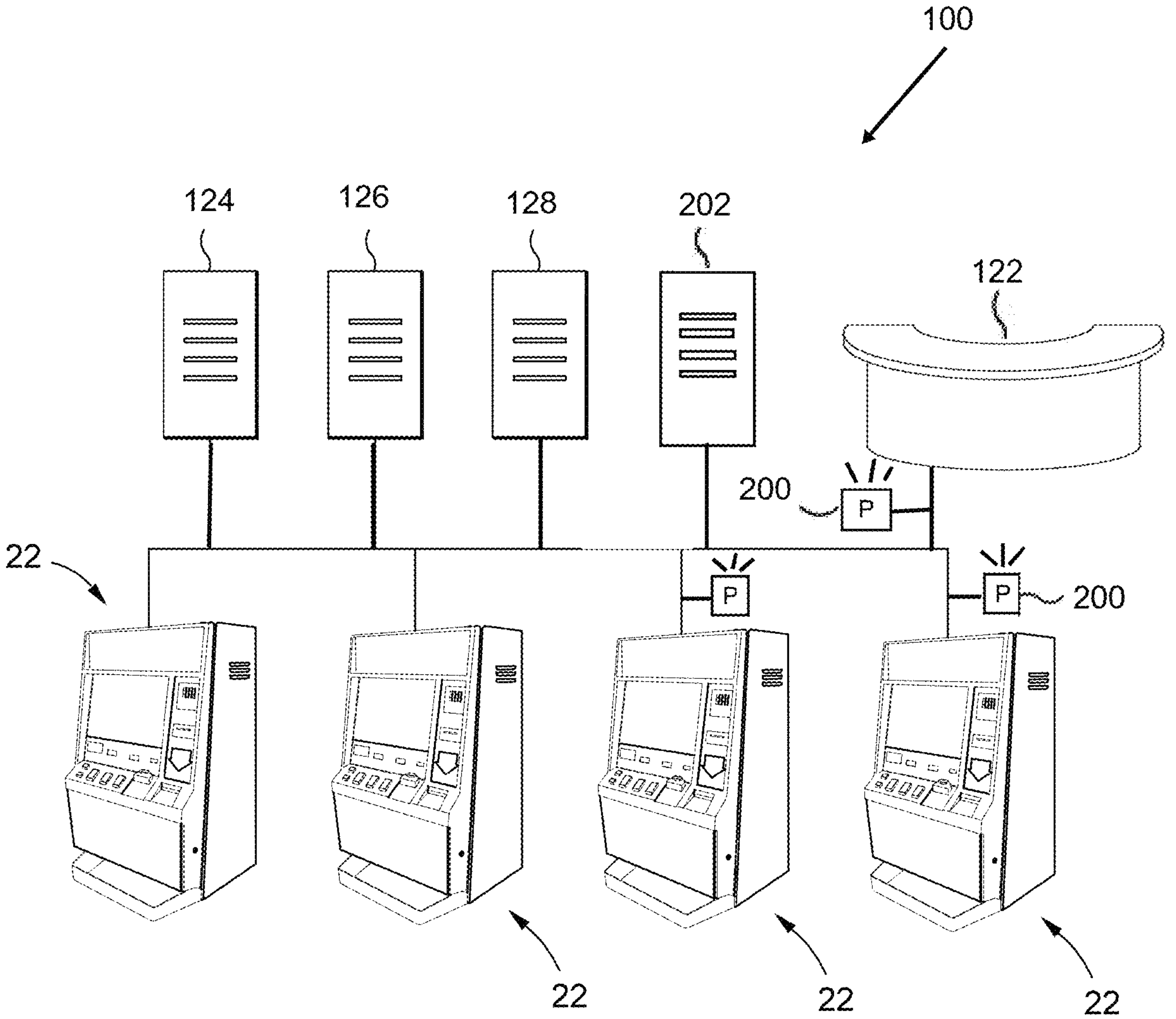
FIG. 1 illustrates one embodiment of a gaming system of the invention.

One embodiment of the invention is a gaming system 100, such as illustrated in FIG. 1. The gaming system 100 may have various features. The gaming system 100 may include one or more gaming machines 22 and one or more gaming tables 122. The gaming system 100 may include a player tracking server or system 124, an accounting system or server 126, a ticketing system 128, and/or other systems and devices (such as a bonusing system, one or more kiosks, casino cages, etc., which are not shown in FIG. 1). In various embodiments, the certain sub-systems or features may be implemented by one or more servers.

Preferably, the gaming system 100 includes one or more holographic projectors 200 and/or a holographic projection system 202 which includes one or more of such projectors, as described in more detail below.

One configuration of a gaming machine 22 of such a gaming system 100 is illustrated in FIG. 1. As illustrated, the gaming machine 22 generally comprises a housing or cabinet 26 for supporting and/or enclosing various components required for operation of the gaming machine. In the embodiment illustrated, the housing 26 includes a door located at a front thereof, the door capable of being moved between an open position which allows access to the interior, and a closed position in which access to the interior is generally prevented. The configuration of the gaming machine 22 may vary. In the embodiment illustrated, the gaming machine 22 has an "upright" configuration. However, the gaming machine 22 could have other configurations, shapes or dimensions (such as being of a "slant"-type, "bar-top" or other configuration as is well known to those of skill in the art).

The gaming machine 22 preferably includes at least one first display device 28 configured to display game information. The display device 28 may comprise an electronic video display such as a cathode ray tube (CRT), high resolution flat panel liquid crystal display (LCD), projection LCD, plasma display, field emission display, digital micromirror display (DMD), digital light processing display (DLP), LCD touchscreen, a light emitting display (LED) or other suitable displays now known or later developed, in a variety of resolutions, sizes and formats (e.g. 4:3, widescreen or the like). The display device 28 may be capable of projecting or displaying a wide variety of information, including images, symbols and other indicia or information associated with game play, game promotion or other events. The gaming machine 22 might include more than one display device, such as a main or first display device 28 and a secondary display device (not shown). The two or more display devices might be associated with the housing or a top box or other portion which includes the one or more second display devices 30. Also, the gaming machine 22 might include side displays (such as mounted to the exterior of the housing 26) and might include multiple displays of differing sizes.

While the display devices may comprise one or more video displays, (such as for presenting video poker, video slots or other video-based games) in another embodiment, the gaming machine 22 may include one or more physical reels capable of displaying game information, such as slot symbols. In such a configuration, means are provided for rotating the physical reels. In one or more embodiments, the means may comprise a mechanical linkage associated with a spin arm, with movement of the spin arm (a "pull") by a user causing the reels to spin. In such an arrangement, the reels are generally allowed to free-wheel and then stop. In another embodiment, electronically controlled mechanisms are arranged to rotate and stop each reel. Such mechanisms are well known to those of skill in the art. In this arrangement, actuation of the spin arm or depression a spin button causes a controller (not shown) to signal the activation of the spin mechanism associated with one or more of the reels. Preferably, the controller is arranged to either turn off the signal to the device(s) effecting the rotation of each or all of the reels or generates a signal for activating a braking device, whereby the reels are stopped. The principal of such an arrangement is described in U.S. Pat. No. 4,448,419 to Telnaes, which is incorporated herein by reference.

The gaming machine 22 is preferably configured to present one or more games upon a player making a monetary payment or wager. In this regard, as described in more detail below, the gaming machine 22 includes mechanism or means for accepting monetary value.

In one embodiment, certain game outcomes (but preferably not all game outcomes) may be designated as winning outcomes (the non-winning outcomes may be referred to as losing outcomes). Prizes or awards may be provided for winning outcomes, such as monetary payments (or representations thereof, such as prize of credits), or promotional awards as detailed herein. As detailed below, the gaming machine 22 preferably includes a mechanism or means for returning unused monetary funds and/or dispensing winnings to a player.

The gaming machine 22 preferably includes one or more player input devices 30 (such as input buttons, plunger mechanisms, a touch-screen display, joystick, touchpad or the like). These one or more input devices 30 may be utilized by the player to facilitate game play, such as by providing input or instruction to the gaming machine 22. The input devices may further comprise remote input devices to detect an input from the player remote from the gaming machine 22. These devices may include a camera utilizing image recognition technology to detect an input from a player, a motion sensing device, RFID, NFC, or other wireless protocol. Such input devices 30 may be utilized by a player to place a wager, cause the gaming machine 22 to initiate a game, to initiate a reel spin, to "cash out" of the gaming machine, or to provide various other inputs.

The gaming machine 22 may include at least one microprocessor or controller for controlling the gaming machine, including receiving player input and sending output signals for controlling the various components or peripheral devices of the machine 22 (such as generating game information for display by the display device(s) 28). The controller may be arranged to receive information regarding funds provided by a player to the gaming machine 22, receive input such as a purchase/bet signal when a purchase/bet button is depressed, and receive other inputs from a player. The controller may be arranged to generate information regarding a game, such as generating game information for display by the at least one display device 28 (such as information comprising game symbols, bonus awards, progressive jackpot awards, etc., depending on the particular game), for determining winning or losing game outcomes and for displaying information regarding awards for winning game outcomes, among other things.

The controller may be configured to execute machine-readable code or "software" or otherwise process information, such as obtained from a remote server. Software or other instructions may be stored at a memory or data storage device, e.g. in a fixed or non-transitory configuration. The memory may also store other information or data, such as data stored in table or other forms (including, but not limited to look-up tables, pay tables and other information including tracked game play information). The gaming machine 22 may also include one or more random number generators for generating random numbers (such as implemented by a random number generator software module stored in the memory and executable by the processor), such as for use in selecting slot symbols, multiplier values and for presenting the game in a random fashion (e.g. whereby the game is presented in a manner in which the player cannot control the outcome) or pseudo-random fashion (e.g. such as where the game includes a skill component which can affect the outcome of the game).

Preferably, the controller is configured to execute machine-readable code or instructions (e.g. software) which are configured to implement the game. In this regard, the gaming machine 22 is specially configured to present the game of the invention via specific software and/or hardware which causes the gaming machine to operate uniquely. For example, the controller of the gaming machine 22 may be configured to detect a wager, such as a signal from a player's depressing of the "bet one" button. Upon such an event and/or the player otherwise signaling the gaming machine to present the game, the controller may be configured to cause the at least one display 28 to display unique information, such as a unique graphical interface or unique game display, including game symbols or other game information. The controller may accept input from a player of game inputs, such as a request to spin reels or the like, via the one or more player input devices of the gaming machine 22. As indicated above, the machine-readable code may be configured in various manners, such as by having various "modules" of software which are designed to implement specific features of the game play or game presentation.

Referring to FIG. 1, the gaming machine 22 may be configured to generate and present games in a stand-alone manner or it may be in communication with one or more external devices or systems at one or more times. The gaming machine 22 might communicate with one or more of such external devices or systems via one or more communication ports or other interface devices. These ports or interface devices may be configured to implement various communication protocols (including proprietary protocols) and communicate via wireless, wired or other communication link. For example, the gaming machine 22 may be configured as a server based device and obtain game code or game outcome information from a remote game server (in which event the gaming machine controller may receive game information from the server, such as game outcome information, and use that server-generated information to present the game at the gaming machine).

Figure 2:
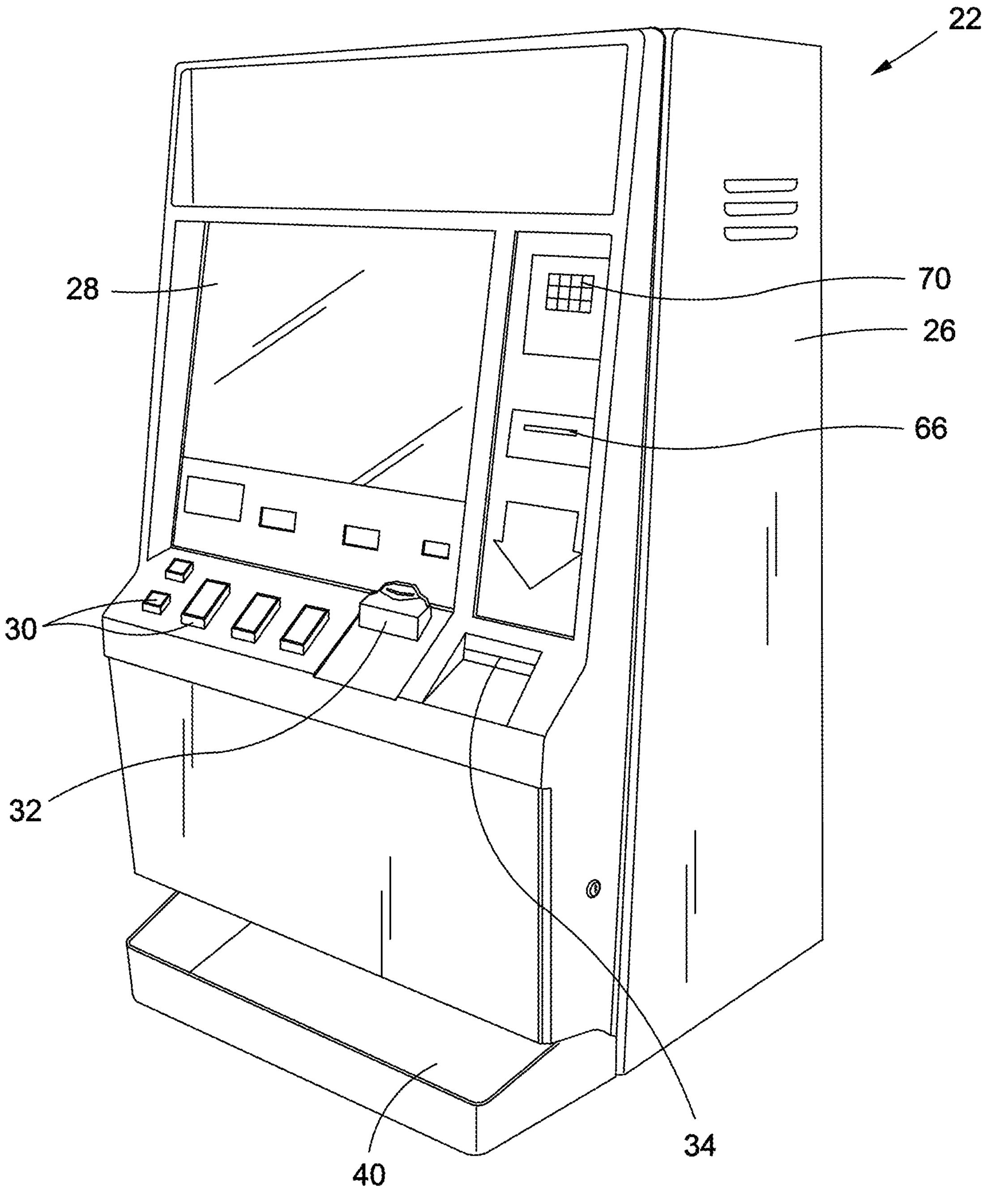
FIG. 2 illustrates one embodiment of a gaming machine.

As indicated, the gaming machine 22 is configured to present one or more wagering games. The gaming machines 22 is preferably configured to accept value, such as in the form of coins, tokens, paper currency or other elements or devices representing value such as monetary funds. Thus, as indicated above, the gaming machine 22 preferably includes a mechanism or means for accepting monetary value. For example, the gaming machine 22 might include a coin acceptor 32 for accepting coins. Of course, associated coin reading/verifying devices and coin storage devices may be associated with the gaming machine 22 if it is configured to accept coins. Likewise, as illustrated in FIGS. 1 and 2, the gaming machine 22 might include a media reader 66. Such a reader may be configured to accept and read/verify paper currency and/or other media such as tickets. Of course, in such event the gaming machine 22 may further be configured with one or more paper currency or ticket storage devices, such as cash boxes, and other paper currency or media handling devices (including transport devices).

The gaming machine 22 might also be configured to read FOBs, magnetic stripe cards or other media having data associated therewith and via which value or funds may be associated with the gaming machine 22. The mechanism for accepting monetary value might also comprise hardware and/or software which allows a player to transfer (such as electronically) funds from an account, such as a casino wagering account, or a bank or other financial institution account. Such a mechanism might include a communication interface which permits the gaming machine to communicate with a mobile phone, PDA, tablet or other electronic device of the player (such as via a physical interface or wired or wireless communications, such as to enable the transfer of funds from the player to the gaming machine or system.

When the player associates funds with the gaming machine or an associated system, a credit balance is generated. The credit balance may comprise a plurality of monetary value credits. The player may wager some or all of the associated monetary value, such as by wagering one or more of the credits associated with the credit balance. For example, the player might provide input to a wager button or touch screen interface to wager a certain number of credits (such as "Bet 1 Credit", "Bet 5 Credits", "Bet Maximum Credits" or other options). In one embodiment, when the player's wager is received, the player's credit balance is reduced by the number of wagered credits. The player might then provide a separate input to begin the game. In other embodiment, the player might select a "play game" input, such as by pressing a "spin" button, which input is taken to comprise both an instruction to place a wager (such as of a pre-set or pre-selected number of credits) and to start the game. Of course, other configurations may be implemented for accepting monetary value from the player and for allowing the player to place a wager from the associated monetary value.

In one embodiment, the gaming machine 22 is configured to award winnings for one or more winning wagering game outcomes. Such winnings may be represented as credits, points or the like. In one embodiment, the player may "cash out" and thus remove previously associated funds and any awarded winnings or such may otherwise be paid to the player. These winnings may be associated with the player's credit balance, thus increasing the player's credit balance.

In one embodiment, the player may provide an input to the gaming machine 22 to indicate their desire to cash out, such as by selecting a "cash out" button or touch screen feature or providing other input. In response, a monetary value represented by the player's credit balance or the like is preferably paid, transferred or otherwise provided to the player. For example, upon an award or at cash-out, associated funds may be paid to the player by the gaming machine 22 dispensing coins to a coin tray 40. In another embodiment, funds may be issued by dispensing paper currency or other media. In yet another embodiment, a player may be issued a media, such as a printed ticket, which ticket represents the value which was paid or cashed out of the machine. The aspects of gaming machine "ticketing" systems are well known. One such system is described in U.S. Pat. No. 6,048,269 to Burns, which is incorporated herein in its entirety by reference. In yet another embodiment, the cash-out might result in the dispensing of a card or other media which stores or represents the cashed-out funds, such as by writing funds information to a magnetic stripe of a card which is inserted into a media writer of the gaming machine or dispensed from the machine. In this regard, the gaming machine 22 may include one or more media printers or writers 34. In other embodiments, the cash-out mechanism may result in the funds value being transferred to an external device or account, such as a player's casino account (such as associated with a casino server), a remote bank or other financial account, or an electronic device such as a player's phone, PDA or tablet.

The gaming machine 22 may also include a player tracking device, such as a card reader and/or an associated keypad 70 or other input device (such as a touch screen display). Such player tracking devices are well known and may permit the game operator to track play of players of the gaming machine. The tracked play may be utilized to offer player bonuses or awards.

Figure 3:
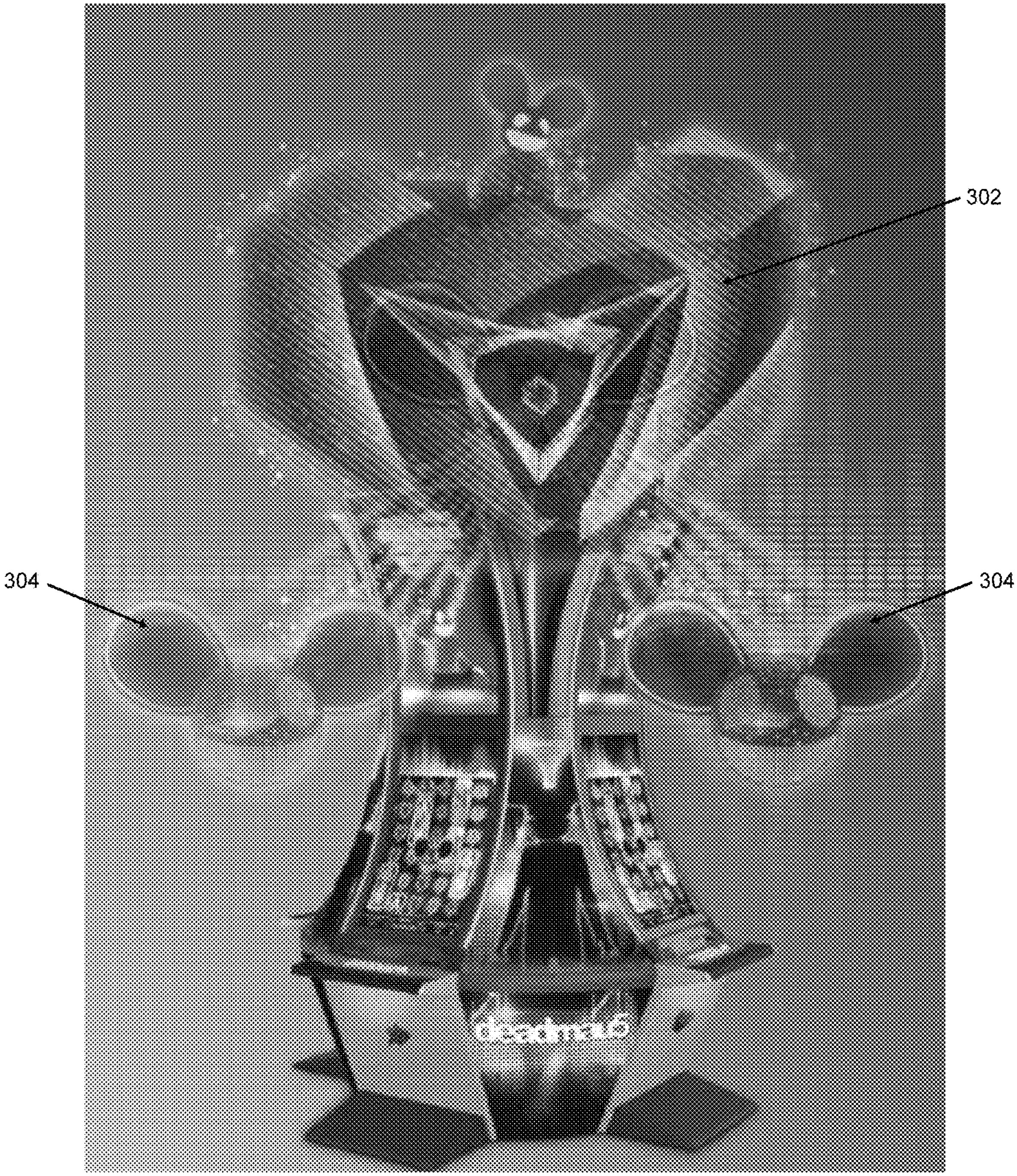
FIG. 3 illustrates one embodiment of a group of gaming machines having at least one associated holographic projection feature which displays at least one hologram.
Figure 4:
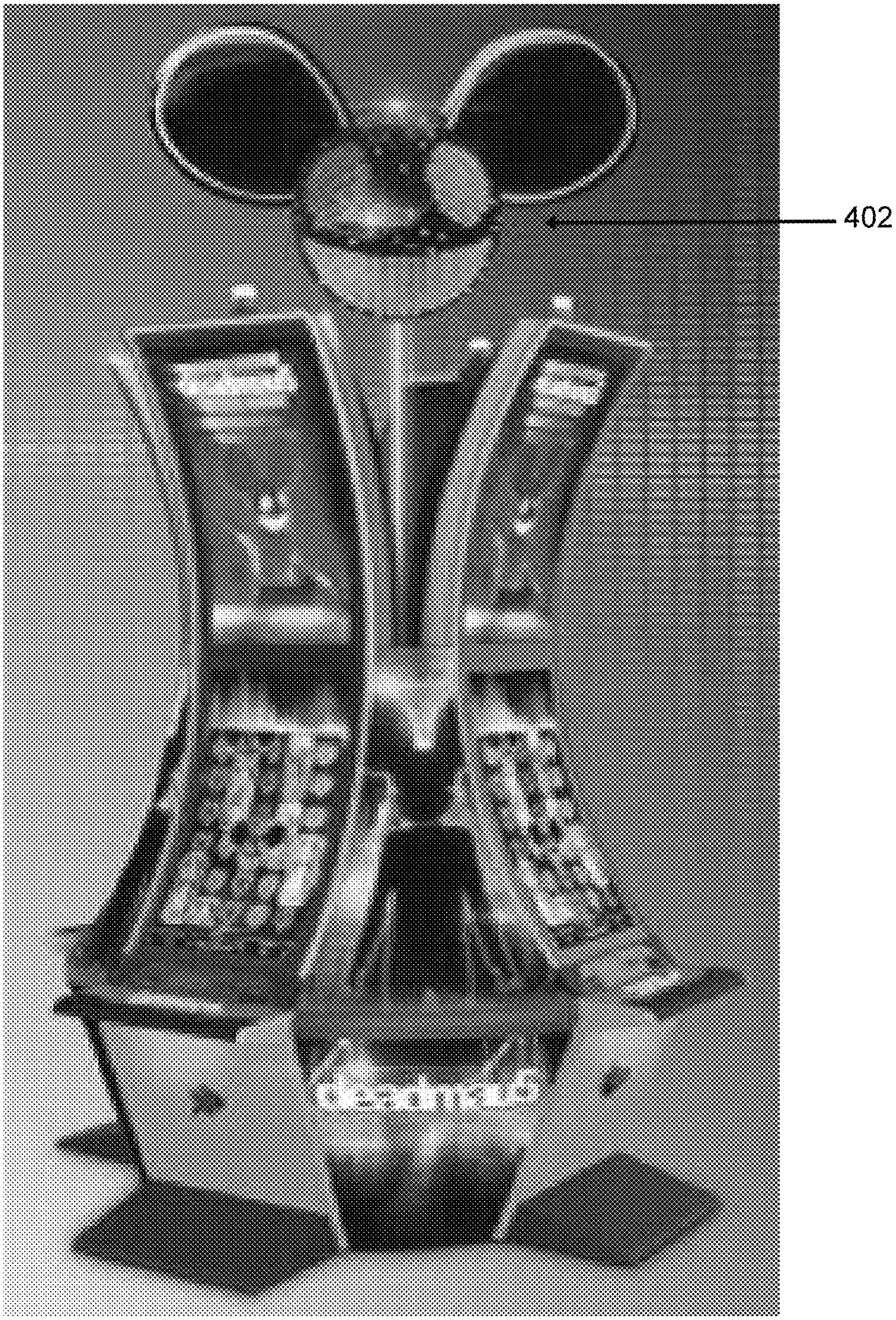
FIG. 4 illustrates another embodiment of a group of gaming machines having at least one associated holographic projection feature which displays at least one hologram.

As illustrated in FIG. 1, a casino may have numerous such gaming machines 22, such as located on a casino floor or in other locations. Of course, such gaming machines 22 might be used in other environments, such as an airport, a bar or tavern or other locations. Further, as illustrated in FIGS. 3 and 4, such gaming machines 22 might be arranged into groups or banks of two or more gaming machines (where the gaming machines are physically linked or located in close proximity).

It will be appreciated that the gaming machine illustrated in FIGS. 1 and 2 is only exemplary of one embodiment of a gaming machine. For example, it is possible to for the gaming machine to have various other configurations, including different shapes and styles and having different components than as just described.

As illustrated in FIG. 1, the gaming system 100 may include one or more gaming tables 122 or other devices. Such tables or devices might have various configurations, such as a table surface with an associated layout, such as for presenting card games (such as, but not limited to blackjack, poker, etc.), or other games such as dice games (e.g. craps or other games), roulette, or various other games now known or later developed.

The gaming system 100 and the gaming machines 22 may be utilized in conjunction with and/or include a projection system such as a holographic projection system. The projection system is configured to project images "outside of the box." That is the projection system projects one or more images into the space outside of the gamine machines 22.

The projection system may be any now known or later developed projection system that projects images, such as to create an image on a medium remote from the projector, or in a space or area remote from the projector. For example, the projected image may be a holographic image that is any type of three-dimensional visual imagery that appears to float in space. In some examples, the projection system creates holographic images or illusions of holographic images on glass installed near the gaming machines 22 or bank of gaming machines 22. The image projected on the glass is reflected to the player and to casino patrons in the surrounding area through an effect commonly known as Pepper's Ghost.

In other examples a screen, which may be a flat screen or a curved screen, may be provided near the gaming machine or bank of gaming machines, and one or more images may be projected onto the screens.

In some embodiments, the projector 200 may be disposed on the gaming machine 22 and may project away from the gaming machine to the medium. In some embodiments, there may be multiple projectors that together project the image or images onto the medium. There may be, for example, multiple projectors disposed on the gaming machine. In some embodiments, the projectors may be installed remote from the gaming machine, such as on the ceiling, floor, or other location away from the machine, thus displaying images at or near gaming machines or even in other areas of a casino. One or more projectors (or portions thereof) may be installed on the chair of a gaming machine. In some embodiments, projectors may be installed both on the gaming machine and remote from the gaming machine.

The projection system may provide several features and enhancements to create a new, immersive, and interactive gaming environment. For example, when a triggering event occurs at a gaming machine 22 or at a bank of gaming machines (bonus, big win, bonus feature, etc.), standard signage on a gaming machine may "morph" or appear to morph by projecting holographic images to create a three-dimensional moving images to change the boundaries of the signage in all directions. One example of the use of a projector 402 of the invention in association with a bank of gaming machines is illustrated in FIG. 4.

In other embodiments, there may be an attract mode utilizing the projection system, such as a holographic projection system. The attract system may be utilized by standalone gaming machines or by multiple gaming machines such as a bank of gaming machines forming a given shape. The gaming machines may be standalone in operation or may be linked to provide community awards, such as a progressive jackpot award. The gaming machines may utilize video screens and/or overhead signage such as via a secondary screen or a shared screen at a bank of gaming machines. When the gaming machine or machines are in an attract mode, the holographic projection system may create one or more images, such as three-dimensional images in a space outside of the gaming machines. This display may serve to attract players from around the casino.

In some embodiments, there may be a game feature mode incorporating the holographic projection system. When a gaming player has won a prize, a trigger may cause a three-dimensional holographic image 302 to be displayed in the space outside of the gaming machine, such as illustrated in FIG. 3. In some embodiments, the player may interact with the holographic image 302. For example, the gaming machine may utilize a motion sensor or camera to receive an input from the player by detecting the player interacting with the projected image (such as by detecting the location of a player's hand in space relative to the displayed image(s)). The interaction with the three-dimensional image may trigger the display of different images. For example, the projection system may indicate a prize has been won in response to the interaction with the projected image.

In some embodiments, projected images are used for purely entertaining purposes. In other embodiments, displayed images may be used to award prizes, bonuses or the like. For example, relative to the example embodiment illustrated in FIG. 3, images may be projected into space at or near gaming machines. The location of those images may be associated with a bonus winning outcome. As one example, projected images 304 may be moved around gaming machines of a bank of gaming machines and either stop randomly or stop based upon player input, thus defining the outcome of a bonus event.

In one configuration, such an entertaining event or bonus might be entirely separate from activities at the gaming machine(s), such as game play. In other embodiments, aspects of the images may relate to game play at a gaming machine. For example, when a player enters a particular bonus event at a gaming machine, one or more particular images might be displayed by the projectors. Such images might be used for entertainment purposes or might be used as part of the determination of the outcome of the event.

As illustrated in FIG. 1, in some embodiments, the projectors 200 may be controlled by a content server 202. Such a server may comprise a computing device with a processor, a memory and a database of information, such as image data files. The controller 202 may be used to control the images which are displayed by the one or more projectors 200. In such a configuration, the controller 202 may communicate with other casino systems, such as the gaming machines 22 and tables 122, and the player tracking system, bonusing system, etc. In other embodiments, the projection system 200 could operate independently. Also, in other embodiments, individual projectors may be provided rather than as part of an integrated system with a back-end central controller. An advantage of the backend or central controller 202 is that multiple projectors 200 can be remotely controlled from a single location, such as via a communication network (wired or wireless).

As illustrated in FIG. 1, the projectors 200 may be associated with gaming tables 122 or other gaming elements. Thus, for example, holographic images might be displayed at or near a gaming table, a kiosk or in other areas of a casino.

The use of projected images outside of the gaming machine provides several benefits. Because the presentation of game features or attract features are not limited to the gaming machine itself, the whole area around the gaming machine becomes an immersive gaming environment. This may attract others to watch the game play and to interact with the immersive gaming environment. Further, because the area around the gaming machine becomes an immersive gaming environment, gaming patrons may be more likely to capture the environment, such as with a camera on a mobile device, and share the experience via social media, further driving interest in the gaming machine, the game, and the gaming environment.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A gaming system comprising:

at least two adjacent gaming devices, the gaming devices comprising at least one input device to receive an input from a player and at least one display device to relay gaming information to the player, and a holographic image system configured to project a holographic image into a space outside of the gaming devices and where the holographic image is projected and formed horizontally outwardly spaced from a frontmost vertical plane of one of the gaming devices, wherein the at least two adjacent gaming devices are arranged in a bank of gaming devices, wherein the holographic image system projects a plurality of holographic images with at least one holographic image being associated with a bonus event, and wherein the holographic images are projected into a space vertically above player's playing positions surrounding the bank of gaming devices.

2. The gaming system of claim 1, wherein the holographic images are projected as randomly moving around the gaming devices of the bank of gaming devices to define an outcome of the bonus event.

3. The gaming system of claim 1, wherein the holographic images are projected moving around the gaming devices of the bank of gaming devices based upon a player input to define an outcome of the bonus event.

4. The gaming system of claim 1, where the holographic image is related to game play.

5. The gaming system of claim 4, where the holographic image indicates an award has been won by the player.

* * * * *